United States Patent
Hiramoto (10) Patent No.: US 6,244,928 B1
(45) Date of Patent: Jun. 12, 2001

(54) MACHINE TOOL SYSTEM AND MACHINING METHOD

(75) Inventor: Kazuyuki Hiramoto, Yamanashi (JP)

(73) Assignee: Makino Milling Machine Co., Ltd., Tokyo (JP)

(*) Notice: Subject to any disclaimer, the term of this patent is extended or adjusted under 35 U.S.C. 154(b) by 0 days.

(21) Appl. No.: 09/331,738

(22) PCT Filed: May 19, 1998

(86) PCT No.: PCT/JP98/02195
§ 371 Date: Jun. 25, 1999
§ 102(e) Date: Jun. 25, 1999

(87) PCT Pub. No.: WO99/59774
PCT Pub. Date: Nov. 25, 1999

(51) Int. Cl.[7] .................................................. B24B 49/00
(52) U.S. Cl. .................................................. 451/5; 451/449
(58) Field of Search .................................. 451/5, 8, 9, 449

(56) References Cited

U.S. PATENT DOCUMENTS

| 4,619,078 | 10/1986 | Uhlig . |
| 4,956,944 | * 9/1990 | Ando et al. ..................... 51/165.71 |
| 5,827,112 | * 10/1998 | Ball ........................................ 451/21 |
| 5,916,013 | * 6/1999 | Naumann et al. ..................... 451/51 |

FOREIGN PATENT DOCUMENTS

| 62-134642 | 8/1987 | (JP) . |
| 1-146662 | 6/1989 | (JP) . |
| 5-31669 | 2/1993 | (JP) . |
| 406 00 81 21 | * 1/1994 | (JP) ................................. 451/449 |
| 406 00 81 37 | * 1/1994 | (JP) ................................. 451/449 |
| 7-156050 | 6/1995 | (JP) . |
| 7-204978 | 8/1995 | (JP) . |
| 7-276184 | 10/1998 | (JP) . |

* cited by examiner

Primary Examiner—Derris H. Banks
Assistant Examiner—Hadi Shakeri
(74) Attorney, Agent, or Firm—Reed Smith LLP (57) ABSTRACT

When machining a workpiece (W) with a tool (T) detachably mounted on a spindle (12) included in a machine tool, a machining liquid supply system (42) for supplying a machining liquid into a machining region in which the tool (T) machines has a machining liquid spouting nozzle (44) having a machining liquid spouting opening (44a), the machining liquid spouting nozzle (44) is supported by a support rod (48) and a bracket (50) so as to be moved by moving means (54, 74) in radial directions and circumferential direction with respect to the axis of the spindle (12) in a region around a headstock (10) supporting the spindle (12). The diameter of the tool (T) held on the spindle (12) can be measured by an automatic tool measuring device (30) installed on the machine tool. The position of the machining liquid spouting nozzle (44) of the machining liquid supply system (42) with respect to radial and circumferential directions can be adjusted and changed according to the diameter of the tool (T) and to the change of the diameter of the tool (T) with the progress of a machining operation.

12 Claims, 4 Drawing Sheets

Fig. 4

MACHINE TOOL SYSTEM AND MACHINING METHOD

TECHNICAL FIELD

The present invention relates to a machine tool system and a machining method. More particularly, the present invention relates to a machine tool system and a machining method capable of most properly achieving the removal of chips and the cooling of a workpiece with a machining liquid by spouting it from an optimum position in an optimum direction relative to a part of the workpiece being machined during the machining of the workpiece with a tool. Further, the present invention relates to a machine tool system and a machining method capable of spouting a machining liquid in an optimum machining liquid supply mode on a part of a workpiece being machined according to the diameter and machining condition of a tool with peripheral working elements, such as a grinding wheel or a milling cutter, and to the variation of the positional relation between the tool and the workpiece when machining the workpiece with the tool.

BACKGROUND ART

A machining liquid must flow over a part of a metal workpiece being machined when machining the metal workpiece by a machine tool using a tool to ensure a satisfactory cooling action to remove heat generated in the part of the workpiece being machined and to promote a smooth cutting action of the tool by removing chips.

A conventional machining liquid supply system employed in a conventional machine tool is disclosed e.g., in Japanese Unexamined Utility Model Publication (Kokai) No. 61-124366. The system is of a manually operated type having a machining liquid spouting nozzle disposed in alignment with a tangent to a grinding wheel at a grinding point and supported on a wheel guard so as to be movable in directions perpendicular to the same tangent to the grinding wheel. When using this prior art machining liquid supply system, the operator operates an adjusting handle to locate the machining liquid spouting nozzle in a predetermined positional relation with the grinding wheel regardless of the change of the diameter of the grinding wheel so that a machining liquid is spouted in a direction tangential to the grinding wheel at the grinding point. The conventional machining liquid supply system, however, is not perfectly satisfactory because, when the grinding point is changed during a grinding process, the machining liquid supply system is unable to spout the machining liquid in a direction tangential to the grinding wheel at a new grinding point.

A machining liquid spouting method disclosed in Japanese Unexamined Patent Publication (Kokai) No. 1-146662 has a machining liquid spouting nozzle capable of being turned for indexing about a spindle holding a grinding wheel during a contour grinding process, and controls the position of the machining liquid spouting nozzle relative to a grinding point according to a grinding wheel moving program for the contour grinding process. This conventional machining liquid spouting method, however, turns the machining liquid spouting nozzle about the spindle to adjust machining liquid spouting direction when the grinding point where the grinding wheel grinds a workpiece is displaced, but does not move the machining liquid spouting nozzle radially relative to the center of the grinding wheel. Thus, the conventional method of this prior art teaches nothing about a method of adjusting the machining liquid spouting direction of the machining liquid spouting nozzle when a grinding wheel of a different diameter is mounted on the spindle.

A water spouting system for a machining center, disclosed in Japanese Unexamined Patent Publication (Kokai) No. 6-31582 is capable of optionally spouting water through a water spouting nozzle either in a horizontal direction or a vertical direction toward a machining point where a tool of the machining center cuts a workpiece so that water can always be spouted toward the machining point. In this prior art water spouting system, the water spouting nozzle can be moved by a gearing about a spindle holding a tool, the water spouting nozzle is moved in a moving angle when the machining point moves horizontally so that the water spouting nozzle is able to spout water toward the machining point. The water spouting nozzle is turned about its base end to move the tip thereof vertically when the height of the machining point changes in order that the water is spouted exactly toward the machining point.

Since the water spouting nozzle of the prior art water spouting system for a machining center cannot be moved radially with respect to the center of the tool held on the spindle, the water spouting direction of the water spouting nozzle cannot sufficiently correctly be adjusted with respect to the machining point when the diameter of the tool changes.

A grinding machine provided with a wheel guard for covering a grinding wheel is disclosed in U.S. Pat. No. 4,619,078. In this known grinding machine, a grinding wheel held on a spindle is covered with a wheel guard, and a machining liquid spouting nozzle is held on the wheel guard so as to be able to turn together with the wheel guard about the spindle and to be able to be moved radially with respect to the spindle according to the diameter of the grinding wheel. The machining liquid spouting nozzle is turned together with the wheel guard so that a machining liquid can be spouted into a machining region in which the grinding wheel grinds a workpiece and the wheel guard may not interfere with the workpiece.

The known grinding machine is a special machine tool, such as a surface grinder, and the wheel guard for covering the grinding wheel is an essential component. Therefore, if an automatic tool changer is used to mount a tool detachably on the spindle, the tool changing operation of the automatic tool changer is interfered with by the wheel guard and hence the automatic tool changing operation cannot be achieved. Furthermore, the known grinding machine does not have any axis about which the workpiece is rotated, and the workpiece can be fed only linearly along three axes, i.e., an X-, a Y- and a Z-axis. Consequently, some workpieces of a particular shape interfere unavoidably with the wheel guard or the machining liquid cannot be properly spouted into the machining region if the interference between the workpiece and the wheel guard is avoided. The known grinding machine is not provided with any measuring means for measuring the diameter of the grinding wheel, and nothing is disclosed with regard to techniques of automatically adjusting the radial position of the machining liquid spouting nozzle relative to the grinding wheel on the basis of measurement of the diameter of the grinding wheel when the grinding wheel is abraded or the diameter of the grinding wheel is changed by dressing or truing.

SUMMARY OF THE INVENTION

Accordingly, a principal object of the present invention is to provide a machine tool system and a machining method capable of positioning a machining liquid spouting nozzle included in a machining liquid supply system at an optimum position relative to a machining region in which a tool machines a workpiece from the viewpoint of chip removal and cooling according to a change in the diameter of a tool detachably mounted on the spindle of a machine tool or a change in a machining point to spout a machining liquid into the machining region.

Another object of the present invention is to provide a machine tool system and a machining method capable of automatically changing the position of a machining liquid spouting nozzle according to a change in the diameter of a tool made by dressing the tool and of automatically resuming a machining operation.

In accordance with a first aspect of the present invention, there is provided a machine tool system for machining a workpiece in a desired shape by moving a tool detachably mounted on a spindle included in a machine tool and the workpiece attached to a table included in the machine tool relative to each other, which comprises:

- a rectilinear moving means for moving the spindle and the table relative to each other in directions along an X-axis, a Y-axis and a Z-axis;
- a workpiece turning means for turning the workpiece attached to a rotating table having at least one axis of rotation and combined with the table;
- a machining liquid supply means including a machining liquid spouting nozzle for spouting a machining liquid toward a machining region in which the tool engages with the workpiece, and connected by piping to a machining liquid source;
- a nozzle support means disposed in a region surrounding the circumference of the spindle to support the machining liquid spouting nozzle of the machining liquid supply means so that the machining liquid spouting nozzle is movable;
- a first machining liquid spouting nozzle moving means for positioning the machining liquid spouting nozzle of the machining liquid supply means by radially moving the machining liquid spouting nozzle with respect to the tool; and
- a second machining liquid spouting nozzle moving means for positioning the machining liquid spouting nozzle of the machining liquid supply means by moving the machining liquid spouting nozzle along a circle about the tool.

Preferably, the machine tool system further comprises a tool measuring means capable of measuring the diameter or the position of the tip of a tool held on the spindle, and installed at a part of a structural member of the machine tool.

Preferably, the nozzle support means comprises a support rod for supporting the machining liquid spouting nozzle of the machining liquid supply means so that the machining liquid spouting nozzle can be linearly moved in radial directions with respect to the tool; and a cylindrical bracket supporting the machining liquid spouting nozzle supported on the support rod so that the machining liquid spouting nozzle can be moved together with the support rod along a circle about the tool. The cylindrical bracket is guided for movement by a guide member disposed in a region around the spindle.

Preferably, the first machining liquid spouting nozzle moving means is provided with a feed screw means capable of linearly moving the machining liquid spouting nozzle through the support rod in radial directions when driven by a motor, and the second machining liquid spouting nozzle moving means is provided with a worm gearing means capable of moving the machining liquid spouting nozzle trough the bracket along the circle when driven by a motor.

Preferably, the second machining liquid spouting nozzle moving means is capable of moving the machining liquid spouting nozzle of the machining liquid supply means around the tool along a circle.

The tool held on the spindle and having the diameter to be measured by the tool measuring means may be a grinding wheel. If the tool is a grinding wheel, the machine tool system may be provided with a tool dressing means for truing or dressing the periphery of the grinding wheel.

In accordance with a second aspect of the present invention, there is provided a machining liquid supply system for supplying a machining liquid into a machining region in which a tool held on the spindle of a machine tool machines a workpiece, which comprises:

- a machining liquid supply means including a machining liquid spouting nozzle for spouting the machining liquid into the machining region, and connected through piping to a machining liquid source;
- a nozzle support means disposed in a region surrounding the spindle to support the machining liquid spouting nozzle of the machining liquid supply means so as to be movable;
- a first machining liquid spouting nozzle moving means capable of radially moving the machining liquid spouting nozzle of the machining liquid supply means with respect to the tool to position the machining liquid spouting nozzle; and
- a second machining liquid spouting nozzle moving means capable of moving the machining liquid spouting nozzle around the tool along a circle to position the machining liquid spouting nozzle.

Preferably, the nozzle support means comprises a support rod supporting the machining liquid spouting nozzle of the machining liquid supply means so that the machining liquid spouting nozzle can linearly be moved in radial directions with respect to the tool; and a cylindrical bracket supporting the machining liquid spouting nozzle supported on the support rod so that the machining liquid spouting nozzle can be moved together with the support rod along a circle about the tool. The cylindrical bracket is guided for movement by a guide member disposed in a region around the spindle.

Preferably, the second machining liquid spouting nozzle moving means is capable of moving the machining liquid spouting nozzle of the machining liquid supply means around the tool along a circle.

In accordance with a third aspect of the present invention, there is provided a machining method of machining a workpiece in a desired shape by moving a tool detachably held on a spindle included in a machine tool and the workpiece attached to a table included in the machine tool relative to each other, which comprises the steps of:

- moving the spindle and the table relatively to each other in linear directions parallel to an X-axis, a Y-axis and a Z-axis;
- turning the workpiece attached to at least one rotating table included in the table when necessary;
- spouting a machining liquid through a machining liquid spouting nozzle included in a machining liquid supply means connected through piping to a machining liquid source toward a machining region in which the tool machines the workpiece;
- moving the machining liquid spouting nozzle of the machining liquid supply means for positioning in radial directions with respect to the tool according to nozzle moving commands corresponding to the dimensions of the tool; and moving the machining liquid spouting nozzle of the machining liquid supply means around the tool along a circle or positioning the same according to nozzle moving commands corresponding to the position of the machining region in which the tool engages with the workpiece defined by a workpiece machining program.

The machining method may measure the diameter or the position or the tip of the tool by a tool measuring means installed at a part of a structural member of the machine tool, and may move the machining liquid spouting nozzle of the machining liquid supply means in radial direction with respect to the tool according to a moving command corresponding to measured data provided by the tool measuring means.

BRIEF DESCRIPTION OF THE DRAWINGS

The above and other objects, features and advantages of the present invention will become more apparent from the ensuing description taken in conjunction with the accompanying drawings, wherein.

BEST MODE FOR CARRYING OUT THE INVENTION

Figure 1:
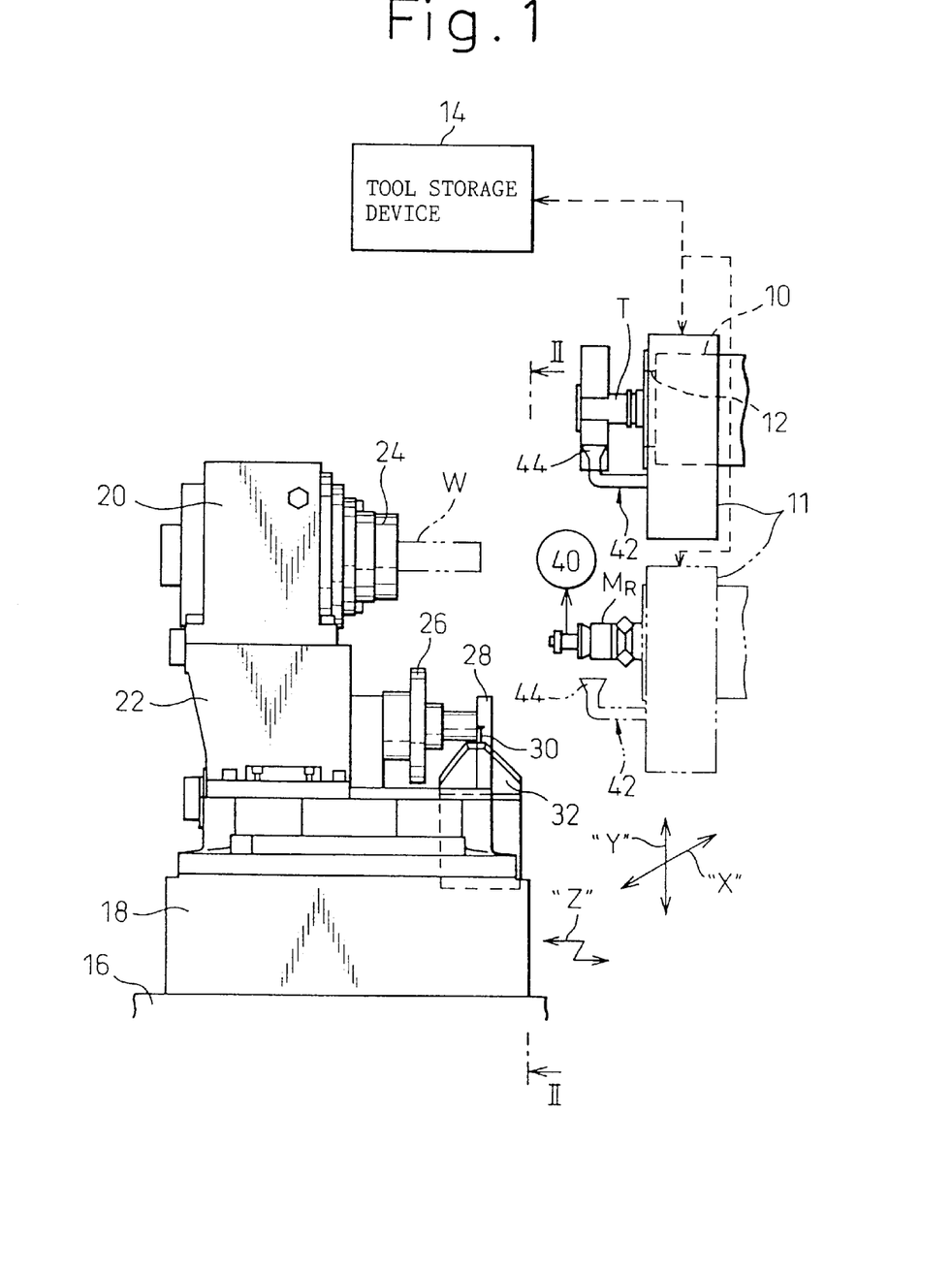
FIG. 1 is a front view of an essential part of a machine tool provided with a machining liquid supply system in a preferred embodiment according to the present invention.
Figure 2:
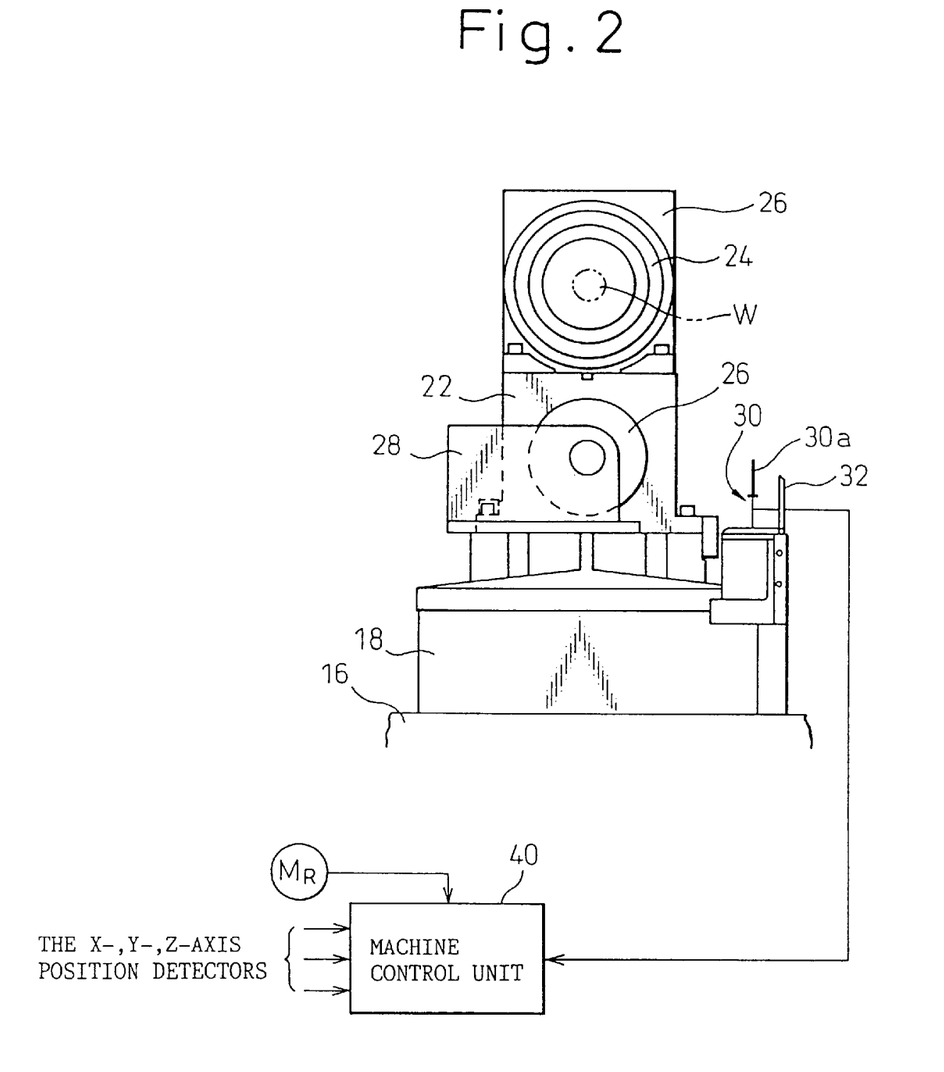
FIG. 2 is a side view of the machine tool of FIG. 1 taken along the arrows substantially along the line II—II in FIG. 1, showing an arrangement of a workpiece holding mechanism, a tool dressing device and an automatic tool measuring device.

Referring to FIGS. 1 and 2, a machine tool has a headstock 10, and a spindle 12 is supported for high-speed rotation in the headstock 10. The headstock 10 is mounted on a column, not shown. The headstock 10 can be moved together with the column relative to a bed, not shown, or can be moved relative to the bed in directions parallel to two orthogonal axes, i.e., an X-axis and a Y-axis as shown in FIG. 1. The respective movements of the headstock 10 and the spindle 12 supported in the headstock 10 in directions parallel to those two orthogonal axes are measured by position sensors, such as scales, installed on the machine tool and associated with those two axes, respectively.

The machine tool is provided with a tool storage unit 14, such as a tool magazine. Either one of the tools T stored in the tool storage unit 14, or a work measuring device MR capable of measuring the external dimensions and the shape of a workpiece W can be detachably mounted on the spindle 12 supported in the headstock 10 by a tool changing mechanism, not shown, such as a generally known tool changing arm. In a state indicated by continuous lines in an upper region in FIG. 1, a grinding wheel T, i.e., an example of a tool T, taken out from the tool storage unit 14 by the tool changing mechanism is mounted on the spindle 12. In a state indicated by broken lines in a lower region in FIG. 1, the work measuring device MR is held on the spindle 12.

A table 18 is mounted on the bed 16 opposite to the headstock 10 so as to be movable in directions parallel to an axis (Z-axis) perpendicular to the foregoing two axes. A rotary head 20 is mounted on a rotary head base 22 supported on the table 18. The work W to be machined is gripped by a work gripping device 24 capable of indexing and held in a central part of the rotary head 20. The work gripping device 24 can be turned for indexing by a driving motor (servomotor), not shown, installed in the rotary head 20.

Another driving motor, not shown, is installed in the rotary head base 22. A tool dressing device (wheel dresser) 26 driven for rotation by the driving motor is supported rotatably by a support 28 with its center axis placed at a known reference position with respect to directions parallel to the three axes, namely, the X-, the Y- and the Z-axis. The outside diameter of the tool dressing device 26 (the outside diameter of the wheel dresser) is stored beforehand together with data on the reference position in a machine control unit 40 (FIG. 2).

An automatic tool measuring device 30 is disposed on the table 18 at a position spaced a distance apart from the tool dressing device 26 along the X-axis. The automatic tool measuring device 30 is disposed at a predetermined reference position with respect to the X-, the Y- and the Z-axis on the table 18, and the reference position is represented by reference position data (coordinates on a coordinate system defined by the X-, the Y- and the Z-axis). As shown in FIG. 2, the automatic tool measuring device 30 can be stored inside the table 18 and can be covered with a lid 32 to avoid damage. The automatic tool measuring device 30 has a probe 30a formed of a hard material. The spindle 12 and the column are moved in directions along the X- and the Y-direction, and the table 18 is moved in directions along the Z-axis to bring the probe 30a of the automatic tool measuring device 30 into contact with the tool T held on the spindle 12 for the measurement of the outside diameter of the tool T. Since the reference position data on the reference position of the probe 30a of the automatic tool measuring device 30 is stored beforehand in the machine control unit 40, the measured outside diameter of the tool T can be determined by calculation based on the reference position data stored previously in the machine control unit 40, and position data on the position of the probe 30a with respect to the X-, the Y- and the Z-axis, when the probe 30a comes into contact with the tool T, given to the machine control unit 40.

The position of the center of the spindle 12 is known and data on the position of the center of the spindle 12 is stored in the machine control unit 40. Therefore when the work measuring device $M_R$ is mounted on the spindle 12 and the probe of the work measuring device $M_R$ is brought into contact with the outer surface of the work W held by the work gripping device 24 by moving the spindle 12 and the table 18 in directions parallel to the X-, the Y- and the Z-axis relative to each other, the machine control unit 40 is able to determine the external dimensions of the workpiece W by simple arithmetic operations from the known data on the reference position of the spindle 12 and the measured movements of the spindle 12 and the table 18. It goes without saying that the automatic tool measuring device 30 may be of a non-contact measuring device capable of measuring the dimensions of the workpiece W without touching the workpiece W.

In the machine tool relating to this embodiment of the present invention, a machining liquid supply system 42 is installed constantly in a region surrounding the headstock 10 provided with the spindle 12. The machining liquid supply system 42 has a machining liquid spouting nozzle 44 and is connected by piping to a machining liquid source, not shown in FIGS. 1 and 2, including a machining liquid tank and such. The machining liquid spouting nozzle 44 has a machining liquid spouting opening 44a at its free end. A machining liquid is spouted through the machining liquid spouting opening 44a into a machining region in which the tool T machines the workpiece W to flush away chips produced in the machining region, to cool both the tool T and the workpiece W and to ensure smooth machining.

Figure 3:
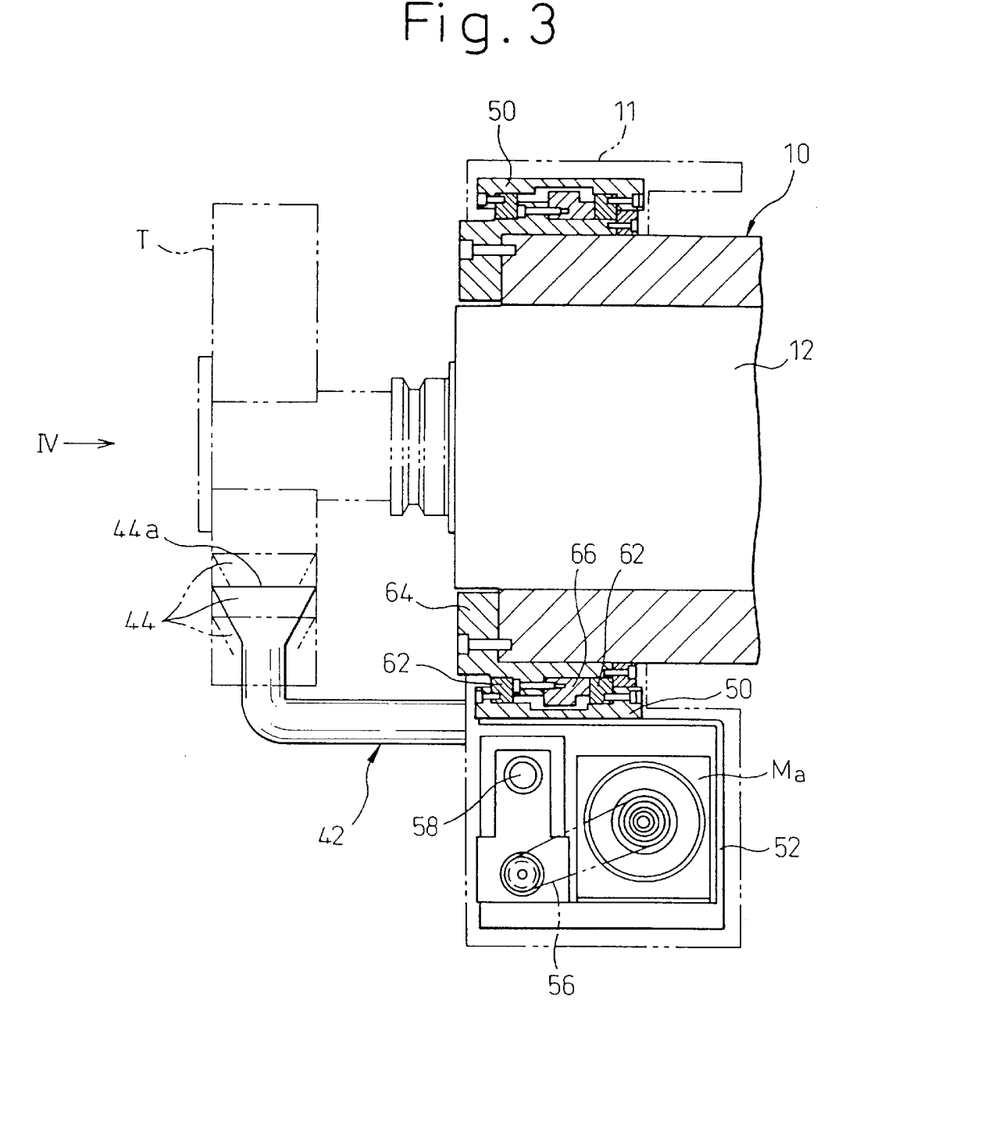
FIG. 3 is a sectional view of a tool held on a spindle rotatably supported in a headstock included in a machine tool, a machining liquid spouting nozzle included in the machining liquid supply system and disposed in a region around the spindle, and a support device for supporting the machining liquid spouting nozzle.
Figure 4:
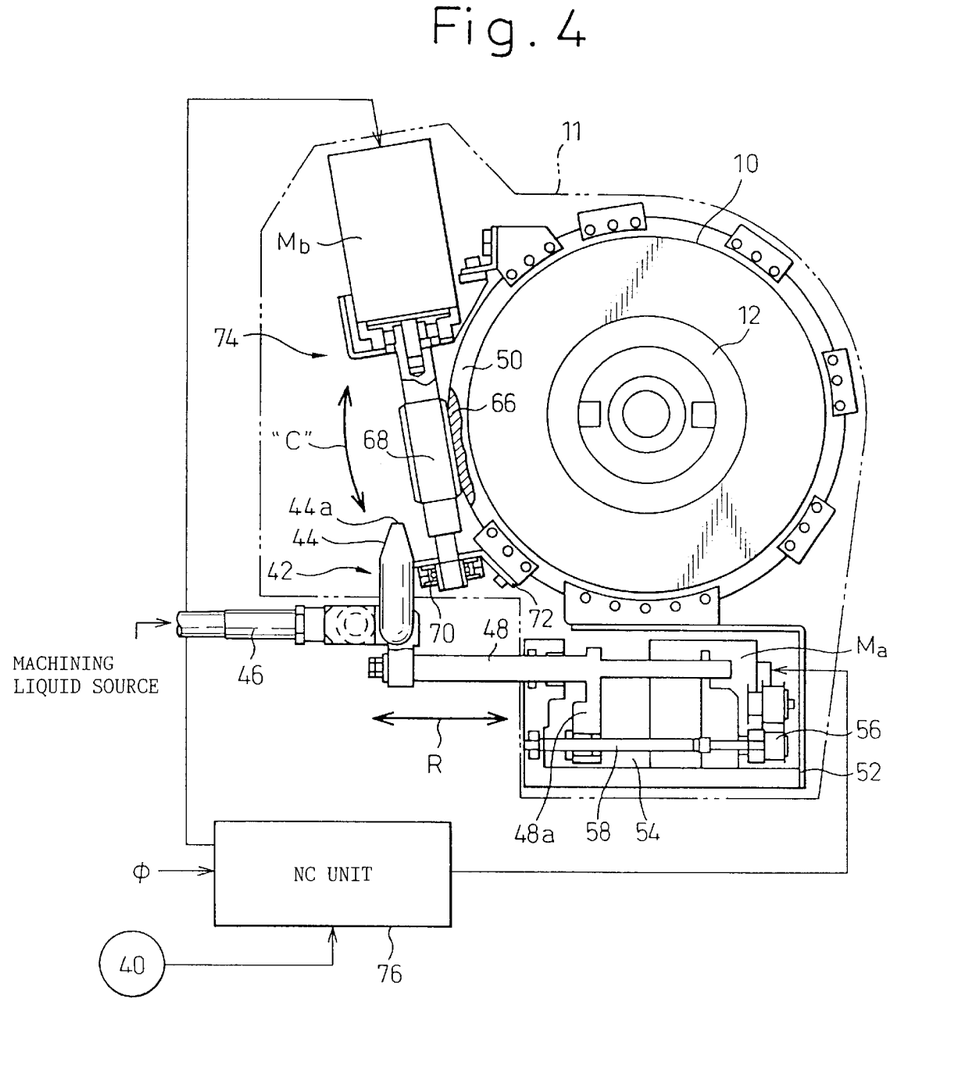
FIG. 4 is a partly sectional side view of the headstock, the spindle, and the machining liquid supply system taken in the direction of the arrow IV in FIG. 3.

A configuration and actions which enables the machining liquid supply system 42 to achieve optimum cooling and chip removal in the machining region in which the tool T machines the workpiece W will be described with reference to FIGS. 3 and 4.

The machining liquid supply system 42 has a machining liquid spouting nozzle 44 provided with a machining liquid spouting opening 44a at its free end, and is connected to the machining liquid source by a pipe 46 and piping elements, not shown, including control valves. The machining liquid spouting nozzle 44 is supported on a support rod 48 connected to a radial moving mechanism 54 installed inside a housing 52 attached to a bracket 50.

The radial moving mechanism 54 has a driving motor Ma, such as a servomotor, and a feed screw shaft 58 is driven for rotation through a belt-and-pulley mechanism 56 by the driving motor Ma. The feed screw shaft 58 is supported for rotation in bearings in the housing 52 and is restrained from axial movement. A nut 48a formed integrally with the support rod 48 is linked to the feed screw shaft 58. When the feed screw shaft 58 is driven for rotation by the driving motor Ma, the support rod 48 is moved axially for a feed operation. Thus, the machining liquid spouting nozzle 44 of the machining liquid supply system 42 is moved linearly in the directions of the arrows R and, consequently, the machining liquid spouting nozzle 44 is moved substantially radially with respect to the axis of the spindle 12 of the headstock 10 to move the machining liquid spouting opening 44a of the machining liquid spouting nozzle 44 radially toward or away from the peripheral working part of the tool T, such as a grinding wheel, a side milling cutter, a fluting cutter or the like, held on the spindle 12.

The bracket 50 is formed as a cylindrical member disposed in a region around a free end part of the headstock 10, and fastened to a pair of slide rings 62 with screws. The slide rings 62 are fitted on a guide ring 64 fitted on the free end of the headstock 10 so as to rotate in the directions of the arrows C about the center axes of the headstock 10 and the spindle 12. When the bracket 50 rotates by sliding along the circumference of the headstock 10, the machining liquid spouting nozzle 44 of the machining liquid supply device 42, supported by the support rod 48 held on the housing 52, revolves in the directions of the arrows C.

An external ring gear 66 is firmly fastened with screws to a middle section of the outer circumference of the guide ring 64. A worm 68 is engaged with the external ring gear 66. The worm 68 has a shaft having one end supported in a bearing 70 and the other end coupled with the output shaft of a driving motor Mb, i.e., a servomotor. The driving motor Mb drives the worm 68 engaged with the external ring gear 66 for rotation. Since the external ring gear 66 is stationary, the worm 68 and the driving motor Mb are forced to turn when the worm 68 is rotated. The bearing 70 supporting the shaft of the worm 68 is supported on a bracket 72 connected to the cylindrical bracket 50. Accordingly, the machining liquid supply device 42 revolves together with the worm 68 and the driving motor Mb along the circumference of the external ring gear 68 about the center axis of the headstock 12 in the directions of the arrows C. Thus, the driving motor Mb, the worm 68 and the external ring gear 66 constitute a circumferential moving mechanism 74 included in the machining liquid supply system 42. The machining liquid spouting nozzle of the machining liquid supply system is turned smoothly along the guide ring 64 for revolution about the spindle 12 by the circumferential moving mechanism 74. The machining liquid spouting nozzle of the machining liquid supply system is able to make one complete revolution around the spindle 12.

The driving motor Ma of the radial moving mechanism 54, and the driving motor Mb of the circumferential moving mechanism 74 are connected to an NC unit 76. The NC unit 76 controls the driving motors Ma and Mb. The NC unit 76 is connected to the machine control unit 40. Input data φ specifying a position of the machining liquid spouting opening 44a of the machining liquid spouting nozzle 44 of the machining liquid supply system 42 with respect to a circumferential direction can be entered into the NC unit 76 by operating an input device, such as a keyboard. The machine control unit 40 gives a command signal specifying a radial position for the machining liquid spouting opening 44a of the machining liquid spouting nozzle 44 with respect to the axis of the spindle 12 determined on the basis of the measured outside diameter of the tool T measured by the automatic tool measuring device 30 to the NC unit 76. The NC unit controls the radial moving mechanism 54 and the circumferential moving mechanism 74 according to the command signals given thereto to move the machining liquid spouting nozzle 44 of the machining liquid supply system 42 in a radial direction and a circumferential direction with respect to the axis of the spindle 12 to a desired position. Thus, the machining liquid spouting opening 44a of the machining liquid spouting nozzle 44 can be located at an appropriate position when machining the workpiece W with the tool T. The cylindrical bracket 50 and the moving mechanisms 54 and 74 are covered with a cover 11.

A description will be given of a method of spouting the machining liquid by the machining liquid supply system 42 when grinding the workpiece W gripped by the work gripping device 24 of the rotary head 20 with a grinding wheel T, i.e., the tool T, held on the spindle 12 of the machine tool.

When grinding the periphery of the workpiece W gripped by the work gripping device 24 on the rotary head 20 with the grinding wheel T mounted on the spindle 12, the machining liquid supply system 42 must be set so that a quantity of the machining liquid as close to the quantity of the same spouted through the machining liquid spouting opening 44a as possible is spouted into the machining region in which the grinding wheel T grinds the workpiece W from an appropriate direction to remove chips from the machining region and to cool the grinding wheel T and the workpiece W.

Accordingly, the machining liquid spouting opening 44a of the machining liquid spouting nozzle 44 of the machining liquid supply system 42 must be positioned at an optimum machining liquid spouting position prior to the start of a grinding operation using the grinding wheel T.

First, the work measuring device $M_R$ is taken out of the tool storage device 14 and is mounted on the spindle 12 of the headstock 10 as indicated by broken lines in FIG. 1.

Subsequently, the headstock 10 is moved in directions along the X- and the Y-direction, and the table 18 is moved in a direction along the Z-axis to bring the work measuring device into contact with the workpiece W gripped by the work gripping device 24 on the rotary head 20. The position detectors attached to the machine tool give position data to the machine control unit 40. Then, the machine control unit 40 calculates the respective movements of the headstock 10 and the axis of the spindle 12, and the movement of the center axis of the rotary head 20, and determines a measured data on the external shape of the workpiece W by calculation using the respective measured movements of the headstock 10, the axis of the spindle 12 and the axis of the rotary head 20, and the previously stored known reference position data on the reference position of the axis of the spindle 12 and the axis of the rotary head 20. Data on the measured dimensions of the workpiece W and the length of a part of the workpiece W to be machined are determined, and data on the positional relation between the outer circumference of the workpiece W and the axis of the spindle 12 with respect to the X-, the Y- and the Z-axis is determined.

The data on the positional relationship between the outer circumference of the workpiece W and the axis of the spindle 12 with respect to the X-, the Y- and the Z-axis is given to the machine control unit 40 for temporary storage.

The work measuring device $M_R$ is removed from the spindle 12 and returned to the tool storage device 14 by a tool changing mechanism. Subsequently, the grinding wheel T for machining (grinding in this example) the workpiece W is taken out from the tool storage device 14 and is mounted on the spindle 12 as indicated by continuous lines in an upper region of FIG. 1.

Then, the machine tool moves the headstock 10 and the table 18 relative to each other in directions along the X-, the Y- and the Z-axis to move the grinding wheel T held on the spindle 12 toward the automatic tool measuring device 30 disposed at a predetermined position on the table 18 and to bring the working part of the grinding wheel T into contact with the probe 30a of the automatic tool measuring device 30. Data on the respective movements of the headstock 10 and, therefore, the axis of the spindle 12, and the table 18 measured by the position sensors are given to the machine control unit 40. Then, the measured diameter of the grinding wheel T can be determined from the data on the reference position of the automatic tool measuring device 30 and the spindle 12 previously stored in the machine control unit 40 and the data on the movements given to the machine control unit 40. Diameter data Da on the outside diameter of the grinding wheel T is stored temporarily in the machine control device 40.

The grinding wheel T is subjected to a dressing process, such as a truing process, when necessary. When subjecting the grinding wheel T to a dressing process by the tool dressing device 26, the grinding wheel T held on the spindle 12 is moved in directions along the X-, the Y- and the Z-axis toward the tool dressing device 26, the working part of the grinding wheel T is brought into contact with the dresser of the tool dressing device 26, and then both the spindle 12 and the dresser are rotated to dress the grinding wheel T. Since data on the reference position of the tool dressing device 26 (the position of the axis) on the table 18 and data on the reference position of the spindle 12 are stored previously in the machine control unit 40, a movement necessary for the grinding wheel to be brought into contact with the working part of the dresser of the tool dressing device 26 can be determined through simple arithmetic operations using the measured data Da on the diameter of the grinding wheel T. The headstock 10 and the spindle 12 are moved toward the tool dressing device 26 held on the table 18 by the movement determined by the arithmetic operations so that the grinding wheel T is brought into contact with the dresser of the tool dressing device 26.

An amount of dressing Dt, i.e., an amount by which the diameter of the grinding wheel T has been reduced by dressing, can be determined from data on the position of the axis of the tool dressing device 26 upon the completion of the dressing of the grinding wheel T, and data on the position of the spindle 12. The diameter Db of the dressed grinding wheel T can be calculated by using: Db=Da−Dt. The diameter Db of the dressed grinding wheel T is stored temporarily in the machine control unit 40.

When dressing the working part of the grinding wheel T by the tool dressing device 26, the respective rotating speeds of the spindle 12 and the dresser of the tool dressing device 26 are selectively and properly determined on the basis of the diameter Da of the grinding wheel T so that the grinding wheel T may not be broken due to rotation at an excessively high rotating speed during dressing, and the spindle 12 and the associated parts of the machine tool may not be damaged.

After the dressing of the grinding wheel T held on the spindle 12 has been completed, a grinding process for grinding the workpiece W is started.

According to the present invention, the machine control unit 40 gives a tool diameter data Db representing the diameter Db of the dressed grinding wheel T to the NC unit 76, the NC unit 76 gives a command determined on the basis of the tool diameter data Db to drive the driving motor Ma of the radial moving mechanism 54 of the machining liquid supply system 42, so that the machining liquid spouting nozzle 44 is moved linearly in the direction of the arrow R (FIG. 4) relative to the axis of the spindle 12 to move the machining liquid spouting nozzle 44 to a position near the peripheral working part of the grinding wheel T. Thus, the machining liquid spouting nozzle 44 is moved according to the diameter of the grinding wheel T and is set at an appropriate position relative to the grinding wheel T.

However, in this state, the machining liquid can not be effectively supplied into a true machining region in which the grinding wheel T engages with the workpiece W to grind the latter.

According to the present invention, a process of moving the machining liquid spouting nozzle of the machining liquid supply system 42 to the machining region is carried out.

The NC unit 76 finds previously a point where the grinding wheel T machines the workpiece W (referred to as "machining point") and a direction in which grinding progresses (referred to as "tool feed direction") from a machining program and, when data φ on the machining point and the tool feed direction is entered by the operator, the NC unit 76 gives a command to the driving motor Mb of the circumferential moving mechanism 74 of the machining liquid supply system 42 to actuate the driving motor Mb. Consequently, the worm 68 engaged with the external ring gear 66 is rotated to move and displace the machining liquid spouting nozzle 44 together with the bracket 50 about the headstock 10, hence about the spindle 12 so that the machining liquid spouting opening 44a of the machining liquid spouting nozzle 44 is located at an optimum machining liquid spouting position near a machining region in which the grinding wheel T grinds the workpiece.

After the machining liquid supply system 42 has thus been set, the arithmetic unit of the machine control unit 40 calculates a direction in which the grinding wheel T is to be fed and a movement by which the grinding wheel T is to be moved on the basis of the data on the positional relation between the workpiece W and the axis of the spindle 12 and the diameter Db of the grinding wheel T temporarily stored in the machine control unit 40, and grinding wheel T is moved to a machining position where the grinding wheel T grinds the workpiece W. Upon the arrival of the grinding wheel T at the machining position, the machine control unit 40 gives a machining liquid supply command to the machining liquid supply system 42 to start spouting the machining liquid through the machining liquid spouting opening 44a of the machining liquid spouting nozzle 44. Then, a grinding operation using the machining liquid for grinding the workpiece W is started. The machining liquid spouting nozzle 44 of the machining liquid supply system 42 may be moved in radial and circumferential directions with respect to the tool T according to a desired shape in which the workpiece is to be machined.

The grinding surface of the grinding wheel T is abraded rapidly during a grinding operation at an abrasion rate higher than that at which a cutting tool is abraded during a cutting operation. Therefore, it is decided that the grinding wheel T is abraded to a limit after the workpiece W has been ground by a fixed amount or after a fixed grinding time has elapsed. If the grinding operation needs to be continued after the workpiece W has been ground by a fixed amount or after a fixed grinding time has elapsed to grind the workpiece W with the grinding wheel T held on the spindle 12, the diameter Db of the grinding wheel T is measured again by the automatic tool measuring device 30 and, if the grinding wheel T needs dressing, the diameter of the grinding wheel T is measured after dressing the grinding wheel T by the tool dressing device 26. Then, the radial and circumferential positions of the machining liquid spouting nozzle of the machining liquid supply system 42 with respect to the headstock 10 are adjusted on the basis of the new diameter of the grinding wheel, and then the grinding operation is resumed. The adjustment of the radial and circumferential positions of the machining liquid spouting nozzle of the machining liquid supply system 42 on the basis of the new diameter of the grinding wheel T can readily be accomplished by using the moving mechanisms 54 and 74. Consequently, the machining liquid can be supplied and spouted toward the machining region in an optimum mode.

It is possible to determine the abrasion of the grinding wheel T to a limit by estimating a change in grinding load on the grinding wheel T from a change in the driving current required by the driving motor for driving the spindle 12 and determining that the grinding stone T has been abraded to a limit when change in the grinding load exceeds a fixed threshold instead of by measuring the ground amount of the workpiece W or the duration of the grinding operation and determining that the grinding wheel has been abraded to a limit after the workpiece has been ground by a fixed amount or the duration of the grinding operation has exceeded a fixed grinding time. The diameter of the tool may be remeasured after thus deciding that the tool has been abraded to a limit, and the tool may be measured after dressing.

Although the foregoing embodiment has been described on an assumption that the tool T is a grinding wheel, it goes without saying that the positional relation between the workpiece W and the spindle 12 may be measured after the tool T is held on the spindle even if the tool T is a cutting tool provided with cutting edges on its circumference, such as a side milling cutter, a fluting cutter or the like, the machining liquid spouting nozzle of the machining liquid supply system 42 may be located at an optimum machining liquid spouting position after measuring the diameter of the tool T, and then the tool T may be engaged with the workpiece W and a cutting operation may be carried out while the machining liquid is spouted in an optimum machining liquid spouting mode.

According to the machine tool system and the machining method in accordance with the present invention, when machining a workpiece W with a tool mounted on a machine tool, the machining liquid can be supplied and spouted through the machining liquid spouting nozzle of the machining liquid supply system from an optimum position relative to a machining region in which the tool carries out a machining operation, i.e., from an optimum position from the viewpoint of chip removal and cooling the tool and the workpiece.

According to the present invention, the tool T is changed by a tool changing means and the machining liquid can be spouted into the machining region always from an optimum position even when the tool is changed or the diameter of the tool changes during use due to abrasion by measuring the diameter of the tool and properly adjusting the position of the machining liquid spouting nozzle of the machining liquid supply system.

Thus, the machining liquid spouting nozzle can always be set at an optimum position for spouting the machining liquid into a machining region in which a tool mounted on the machine tool carries out a machining operation for optimum chip removal and cooling; consequently, the machining performance of the tool in machining accuracy, surface roughness and such can greatly be improved. Since the tool is always cooled properly and chips are removed, the abrasion of the tool is reduce and thereby the machining cost can be reduced.

According to the present invention, the setting and positioning of the machining liquid spouting nozzle of the machining liquid supply system are achieved automatically by moving the machining liquid spouting nozzle in both radial and circumferential directions with respect to the axis of the spindle by the moving mechanisms employing servomotors as driving means. Therefore, the present invention contributes to the optimization of automatic machining liquid supply when applied to an automatic machine tool system, such as a machining center.

Further, since a workpiece is attached to the rotary head, if the workpiece has a complicated shape, the machining liquid can be spouted from an optimum position by changing the angular position of the machining liquid spouting nozzle. When the machining liquid spouting nozzle is arranged to be able to make one complete revolution around the tool, the machining liquid spouting nozzle does not have any dead space at all for spouting the machining liquid.

What is claimed is:

1. A machine tool system for machining a workpiece in a desired shape by moving a tool detachably mounted on a spindle included in a machine tool and the workpiece attached to a table included in the machine tool and the workpiece attached to a table included in the machine tool relative to each other, said machine tool system comprising:
   a rectilinear moving means for moving the spindle and the table relative to each other in directions along an X-axis, a Y-axis and a Z-axis;
   a workpiece turning means for turning the workpiece attached to a rotary head having at least one axis of rotation and combined with the table;
   a machining liquid supply means including a machining liquid spouting nozzle for spouting a machining liquid toward a machining region in which the tool engages with the workpiece, and connected by piping to a machining liquid source; a nozzle support means disposed in a region surrounding a circumference of the spindle to support the machining liquid spouting nozzle of the machining liquid supply means to that the machining liquid spouting nozzle is movable;

the nozzle support means comprises: a support rod for supporting the machining liquid spouting nozzle of the machining liquid supply means so that the machining liquid spouting nozzle can be linearly moved in radial directions with respect to the tool;

a cylindrical bracket supporting the machining liquid spouting nozzle supported on the support rod so that the machining liquid spouting nozzle can be moved together with the support rod along a circle about the tool, said cylindrical bracket being guided for movement by a guide member disposed in a region around the spindle;

a first machining liquid spouting nozzle moving means for positioning the machining liquid spouting nozzle of the machining liquid supply means by radially moving the machining liquid spouting nozzle with respect to the tool; and a second machining liquid spouting nozzle moving means for positioning the machining liquid spouting nozzle of the machining liquid spouting nozzle along a circle about the tool.

2. The machine tool system according to claim 1 further comprising a tool measuring means capable of measuring a diameter or a position of a tip a tool held on the spindle, and installed at a part of a structural member of the machine tool.

3. The machine tool system according to claim 1, wherein the second machining liquid spouting nozzle moving means is capable of moving the machining liquid spouting nozzle of the machining liquid supply means for one revolution round the tool.

4. The machine tool system according to claim 2, wherein the tool is a grinding wheel.

5. The machine tool system according to claim 4, further comprising a tool dressing means for truing or dressing the grinding wheel.

6. A machining liquid supply system for supplying a machining liquid into a machining region in which a tool held on a spindle included in a machine tool engages with a workpiece for machining through a machining liquid spouting nozzle, said machining liquid supply system comprising:

a machining liquid supply means including the machining liquid spouting nozzle for spouting the machining liquid into the machining region in which the tool engages with the workpiece, and connected through piping to a machining liquid source;

a nozzle support means disposed in a region surrounding the spindle to support the machining liquid spouting nozzle of the machining liquid supply means to as to be movable;

the nozzle support means comprising a support rod supporting the machining liquid spouting nozzle of the machining liquid supply means so that the machining liquid spouting nozzle can be linearly moved in radial directions with respect to the tool;

a cylindrical bracket supporting the machining liquid spouting nozzle supported on the support rod so that the machining liquid spouting nozzle can be moved together with the support rod along a circle about the tool;

said cylindrical bracket being guided for movement by a guide member disposed in a region around the spindle; and a first machining liquid spouting nozzle moving means capable of radially moving the machining liquid spouting nozzle of the machining liquid supply means with respect to the tool to position the machining liquid spouting nozzle; and a second machining liquid spouting nozzle moving means capable of moving the machining liquid spouting nozzle around the tool along a circle to position the machining liquid spouting nozzle.

7. The machining liquid supply system according to claim 4, wherein the second machining liquid spouting nozzle moving means is capable of moving for one revolution round the tool.

8. A machining method of machining a workpiece in a desired shape by moving a tool detachably held on a spindle included in a machine tool relative to each other, said machining method comprising the steps of:

moving the spindle and the table relatively to each other in linear directions parallel to an X-axis, a Y-axis and a Z-axis;

turning the workpiece attached to at least one rotary head included in the table when necessary;

spouting a machining liquid through a machining liquid spouting nozzle included in a machining liquid supply means connected through piping to a machining liquid source toward a machining region in which the tool engages with the workpiece;

moving the machining liquid spouting nozzle of the machining liquid supply means for positioning in radial directions with respect to the tool according to nozzle moving commands corresponding to dimensions of the tool; and moving the machining liquid spouting nozzle of the machining liquid supply means around the tool according to nozzle moving commands corresponding to a position of the machining region in which the tool engages with the workpiece defined by a workpiece machining program.

9. The machining method according to claim 8, wherein the machining liquid spouting nozzle of the machining liquid supply means is moved around the tool along a circle according to the nozzle moving commands.

10. The machining method according to claim 8, wherein the machining liquid spouting nozzle of the liquid supply means is moved around the tool positioning the same according to the nozzle moving commands.

11. The machining method according to claim 8, wherein the tool is provided with a cutting edge and the tool is measured by a tool measuring means installed at a part of a structural member of the machine tool, and the machining liquid spouting nozzle of the liquid supply means is moved in a radial direction with respect to the tool according to a moving command corresponding to measured data provided by the tool measuring means.

12. The machining method according to claim 8, wherein said tool has a diameter, and including tool measuring means for measuring the diameter of the tool installed at a part of a structural member of the machine tool, and the machining liquid spouting nozzle of the machine liquid supply means is moved in a radial direction with respect to the tool according to a moving command corresponding to measured data provided by the tool measuring means.

* * * * *